(12) United States Patent
Lindlau et al.

(10) Patent No.: US 11,098,664 B2
(45) Date of Patent: Aug. 24, 2021

(54) METHOD FOR OPERATING AN INTERNAL COMBUSTION ENGINE, INCLUDING AN HC SENSOR INTEGRATED INTO A PURGE GAS LINE

(71) Applicant: Volkswagen Aktiengesellschaft, Wolfsburg (DE)

(72) Inventors: Michael Lindlau, Cremlingen (DE); Michael Brand, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 17/025,737

(22) Filed: Sep. 18, 2020

(65) Prior Publication Data

US 2021/0079859 A1  Mar. 18, 2021

(30) Foreign Application Priority Data

Sep. 18, 2019  (DE) ............... 10 2019 214 236.2

(51) Int. Cl.
    *F02D 41/00*  (2006.01)

(52) U.S. Cl.
    CPC ..... *F02D 41/0042* (2013.01); *F02D 41/0045* (2013.01); *F02D 41/0032* (2013.01); *F02D 2200/0611* (2013.01); *F02D 2200/0614* (2013.01)

(58) Field of Classification Search
    CPC .............. F02D 41/0042; F02D 41/004; F02D 41/1454; F02D 41/221; F02D 41/2438; F02D 41/2454; F02D 41/0045; F02D 2200/0611; F02D 2200/021; F02D 2200/70; F02M 25/0872; F02M 25/0836; F02M 25/089
    See application file for complete search history.

(56) References Cited

U.S. PATENT DOCUMENTS

| | | | |
|---|---|---|---|
| 6,234,156 B1 | 5/2001 | Muto | |
| 7,316,225 B2 | 1/2008 | Murakami | |
| 7,866,424 B2 | 1/2011 | Sauvlet et al. | |
| 9,151,737 B2 | 10/2015 | Bierl et al. | |
| 9,556,828 B2 | 1/2017 | Weigl | |

(Continued)

FOREIGN PATENT DOCUMENTS

| | | |
|---|---|---|
| DE | 10 2007 002 188 A1 | 7/2008 |
| DE | 10 2008 062 550 A1 | 6/2010 |

(Continued)

*Primary Examiner* — George C Jin
(74) *Attorney, Agent, or Firm* — Muncy, Geissler, Olds & Lowe, P.C.

(57) ABSTRACT

A method for operating an internal combustion engine is provided, which has a combustion unit, including a combustion chamber; a fresh gas tract; an exhaust tract, including an exhaust gas sensor integrated therein; and a fuel tank system. During an operation of the internal combustion engine, while purge gas is conducted via a purge gas line a hydrocarbon content of the purge gas is ascertained with the aid of the HC sensor, and the mass flow of the purge gas is also ascertained, and a fuel mass flow introduced into the fresh gas tract is ascertained from these values in combination and a quantity of fuel introduced into the combustion chamber and/or into the fresh gas tract with the aid of at least one fuel injector is adapted.

8 Claims, 1 Drawing Sheet

(56) References Cited

U.S. PATENT DOCUMENTS

| | | | |
|---|---|---|---|
| 9,617,944 B2 | 4/2017 | Dean | |
| 9,797,344 B2 * | 10/2017 | Jeffrey | F02M 25/0836 |
| 9,909,540 B2 | 3/2018 | Heinrich et al. | |
| 2011/0289999 A1 * | 12/2011 | Bierl | F02D 41/2474 |
| | | | 73/1.06 |
| 2011/0313642 A1 | 12/2011 | Sano et al. | |
| 2018/0023497 A1 * | 1/2018 | Dudar | F02D 41/222 |
| | | | 701/103 |
| 2019/0242310 A1 * | 8/2019 | Dudar | F01M 13/0011 |
| 2020/0309069 A1 | 10/2020 | Eser et al. | |

FOREIGN PATENT DOCUMENTS

| | | |
|---|---|---|
| DE | 10 2010 048 313 A1 | 4/2012 |
| DE | 11 2011 103 454 A5 | 8/2013 |
| DE | 10 2013 221 797 A1 | 4/2015 |
| DE | 10 2015 114 071 A1 | 3/2016 |
| DE | 10 2016 113 749 A1 | 2/2017 |
| DE | 10 2017 209 127 A1 | 12/2018 |
| DE | 10 2017 223 277 A1 | 6/2019 |

\* cited by examiner

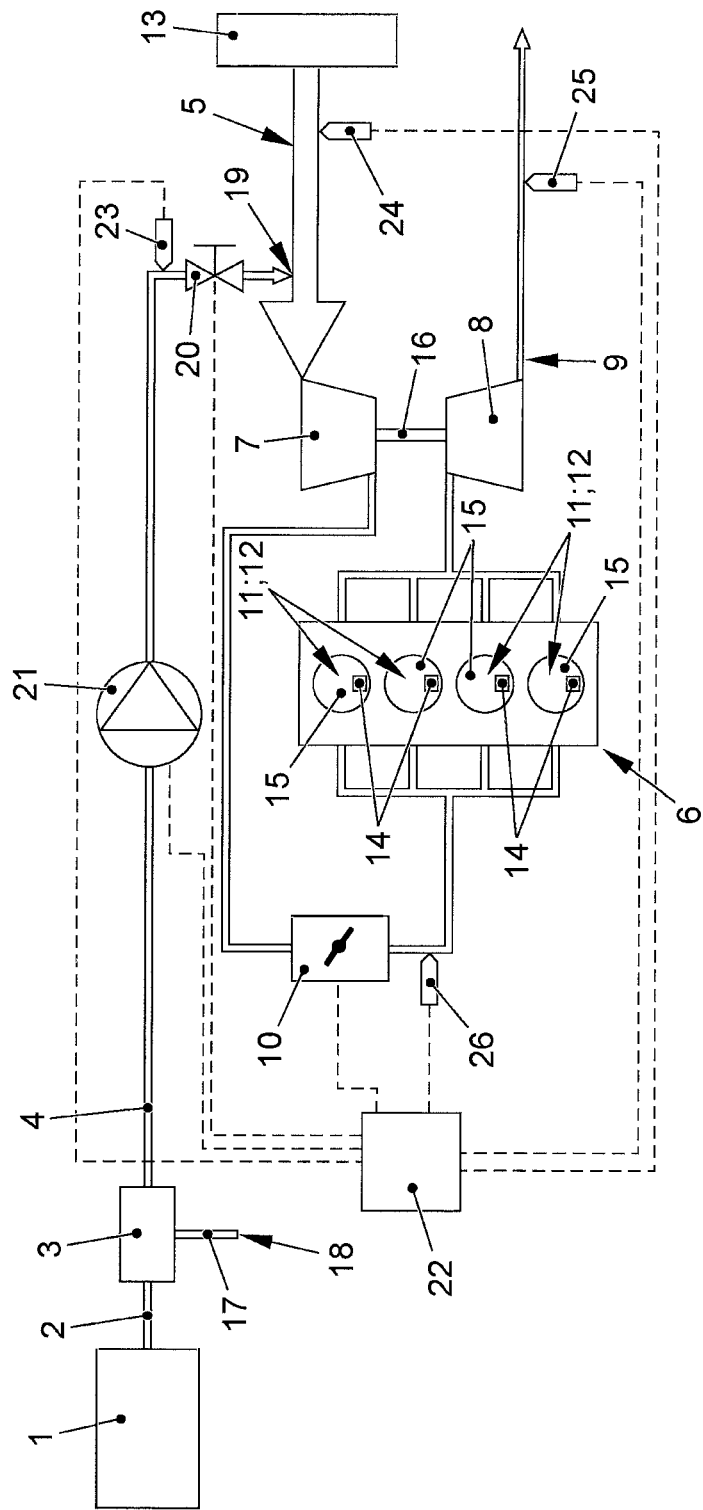

METHOD FOR OPERATING AN INTERNAL COMBUSTION ENGINE, INCLUDING AN HC SENSOR INTEGRATED INTO A PURGE GAS LINE

This nonprovisional application claims priority under 35 U.S.C. § 119(a) to German Patent Application No. 10 2019 214 236.2, which was filed in Germany on Sep. 18, 2019, and which is herein incorporated by reference.

BACKGROUND OF THE INVENTION

Field of the Invention

The present invention relates to a method for operating an internal combustion engine, including a fuel tank system, which, on the one hand, comprises a fuel vapor filter to permit a venting of a fuel tank of the fuel tank system as needed, and which, on the other hand, includes a purge gas line leading from the fuel vapor filter to a fresh gas tract of the internal combustion engine to permit a purging of the fuel vapor filter or the fuel tank system as needed. The invention also relates to an internal combustion engine suitable for carrying out a method of this type as well as a motor vehicle including an internal combustion engine of this type.

Description of the Background Art

A fuel tank system for an internal combustion engine of a motor vehicle regularly includes a venting line, which makes it possible to vent the fuel tank of the fuel tank system, i.e. to release a rising pressure in the fuel tank to the surroundings as a result of, for example, fuel evaporating at relatively high ambient temperatures. Also, no fuel vapors should preferably reach the surroundings, due to on emission regulations. This is prevented by integrating a fuel vapor filter into the venting line, which is regularly designed in the form of an active carbon filter, which absorbs the fuel vapors during a venting of the fuel tank.

A fuel tank system of this type is additionally provided with a purge gas line, in particular for regenerating the fuel vapor filter, which is connected with the fuel vapor filter, on the one hand, and with the fresh gas tract of the internal combustion engine, on the other hand. During the operation of the internal combustion engine, ambient air may be periodically sucked in via a surroundings opening of the fuel vapor filter by means of underpressure, which prevails in the area of the opening of the purge gas line to the fresh gas tract, compared to the ambient pressure. This ambient air then flows through the fuel vapor filter in the opposite direction to the flow direction, in which the fuel vapors coming from the fuel tank have flowed through the fuel vapor filter, whereby the fuel vapor filter is purged. The fuel vapors from the fuel vapor filter are then supplied to the combustion chambers of the combustion unit of the internal combustion engine via the purge gas line and the fresh gas tract.

If the mass flow of the fuel introduced via the purge gas line into the fresh gas tract and from there into the combustion chambers is not know with sufficient accuracy, a regeneration of this type or purging of the fuel vapor filter may result in the combustion unit being temporarily operated with a mixture ratio that deviates from a relevant setpoint value. At least the harmful raw emissions of the combustion unit may worsen thereby. Such a worsening of the harmful raw emissions is ascertainable with the aid of an exhaust gas sensor, for example with the aid of a lambda sensor, which make it possible to adapt the fuel quantities introduced into the combustion chamber or into the fresh gas tract with the aid of fuel injectors, based on the measured values of this exhaust gas sensor, in order to set a mixture ratio which preferably corresponds to an associated setpoint value even during a purging of the fuel vapor filter.

The disadvantage of this procedure is that the adaptation of the fuel quantities introduced into the combustion chambers takes place only if relatively poor harmful raw emissions of the combustion unit were already ascertained with the aid of the exhaust gas sensor.

To avoid this disadvantage, it may be provided to ascertain the fuel mass flow introduced into the fresh gas tract via the purge gas line during a purging of the fuel vapor filter in order to proactively adapt the fuel quantities introduced into the combustion chambers or into the fresh gas tract with the aid of the fuel injectors. This necessitates a preferably exact knowledge of the purge gas mass flow conducted via the purge gas line as well as the concentration of the fuel, i.e. the hydrocarbons, in this purge gas mass flow.

The concentration of the hydrocarbons in a purge gas mass flow may be ascertained directly with the aid of a corresponding (HC) sensor. An HC sensor of this type may, however, have a relevant measuring error. Moreover, it is sensible to be able to ascertain a defect of an HC sensor of this type as quickly as possible after the defect occurs, in order to avoid a prolonged operation of the combustion unit with a mixture ratio that deviates significantly from a setpoint value.

DE 10 2010 048 313 A1, which corresponds to U.S. Pat. No. 9,556,828, relates to a method for operating a tank venting system, in which a purge gas mass flow, which flows in a purge gas line, is ascertained as a function of the density of the purge gas and the pump characteristics of a purge gas delivery device. It may also be provided to ascertain a hydrocarbon concentration of the purge gas with the aid of an HC sensor.

DE 10 2017 209 127 A1 discloses a method for calculating a mass flow of a fuel/air mixture, which is transferred from a tank venting system to an intake manifold of a combustion unit. A fuel/air ratio of the mass flow is taken into account during the calculation of the mass flow.

SUMMARY OF THE INVENTION

It is therefore an object of the present invention to correct measuring errors of an HC sensor integrated into a purge gas line of a fuel tank system of an internal combustion engine and/or to ascertain a defect of an HC sensor of this type.

According to an exemplary embodiment of the invention, a method is provided for operating an internal combustion engine, the internal combustion engine comprising at least the following components: a preferably spark-ignited and quantity-regulated combustion unit (e.g. a spark-ignition engine), which includes at least one combustion chamber and preferably a plurality of combustion chambers; a fresh gas tract for supplying fresh gas to the combustion unit; an exhaust tract for removing exhaust gas from the combustion unit, including an exhaust gas sensor integrated therein, for example in the form of a so-called lambda sensor; and a fuel tank system.

The fuel tank system comprises at least one fuel tank; one fuel vapor filter, which is fluid-conductively connected to a surroundings opening; one venting line leading from the fuel tank to the fuel vapor filter; and one purge gas line leading from the fuel vapor filter to the fresh gas tract, into which an HC sensor, on the one hand, and a tank venting valve, on the other hand, are integrated, with the aid of which the mass flow of the purge gas conducted via the purge gas line may be set by a more or less or non-occurring throttling; and/or a purge gas delivery device, with the aid of which the purge gas may be actively transported through the purge gas line as needed.

In an example, it is provided that, during the operation of the internal combustion engine, while the purge gas is conducted via the purge gas line, the hydrocarbon content of the purge gas is ascertained with the aid of the HC sensor, and the mass flow of the purge gas is ascertained, and a fuel mass flow introduced into the fresh gas tract is ascertained from these values in combination. A quantity of fuel introduced into the combustion chamber and/or into the fresh gas tract with the aid of at least one fuel injector is adapted for the purpose of compensating for the additional fuel quantity introduced via the purge gas, taking into account a defined total quantity of fuel to be supplied to the combustion chamber in each combustion cycle.

Based on an exhaust gas composition ascertained with the aid of the exhaust gas sensor, the (averaged) mixture ratio of fuel/fresh gas mixture quantities supplied to the combustion chamber is monitored with respect to a deviation from a setpoint value (which may correspond, in particular, to a stoichiometric mixture ratio), which is able to occur despite the adaptation of the fuel introduced with the aid of the fuel injector. If a deviation of this type is ascertained, a correction of the measured value of the HC sensor or the fuel mass flow ascertained therefrom is carried out according to the invention, or the HC sensor is determined or judged to be defective. It may preferably be provided that a correction of the measured value of the HC sensor or the fuel mass flow ascertained therefrom is carried out if the deviation is below a threshold value or corresponds to this threshold value, and the HC sensor is determined to be defective if the deviation is above a (different) or the (same) threshold value.

An internal combustion engine according to an exemplary embodiment of the invention comprises at least a preferably spark-ignited and quality controlled combustion unit, including at least one combustion chamber and preferably including a plurality of combustion chambers; a fresh gas tract for supplying fresh gas to the combustion unit; an exhaust tract for removing exhaust gas from the combustion unit, an exhaust gas sensor being integrated into the exhaust tract; and a fuel tanks system, which comprises at least one fuel tank; one fuel vapor filter, which is fluid-conductively connected to a surroundings opening; one venting line leading from the fuel tank to the fuel vapor filter; one purge gas line leading from the fuel vapor filter to the fresh gas tract, into which an HC sensor, on the one hand, and a tank venting valve and/or a purge gas delivery device, on the other hand, are integrated.

An internal combustion engine according to the invention further comprises a control device, which is designed to automatically carry out a method according to the invention.

The designation "fuel vapor filter" does not mean, according to the invention, that the latter must necessarily filter the volatile fuel in gaseous form. Instead, the fuel may have already been (partially) condensed out during the filtering.

An ascertainment of the mass flow of the purge gas within the scope of the method according to the invention may be implemented (exclusively) by one or multiple measurements. An internal combustion engine according to the invention may then comprise one or multiple corresponding sensors. An ascertainment of this type may also be further carried out by a modeling, i.e. by a computational ascertainment, based on (possibly measured) operating parameters of individual or multiple components of the internal combustion engine, for example based on the opening position of the tank venting valve and/or a driving power of the purge gas delivery device.

The invention is based on the finding that measuring errors of the HC sensor may be ascertained and/or the functionality of the HC sensor may be checked in an advantageous manner with the aid of an exhaust gas sensor integrated into the exhaust tract. It is particularly advantageous that an exhaust gas sensor of this type is usually already provided in an internal combustion engine, typically at least in the form of a lambda sensor, so that essentially no additional structural components of the internal combustion engine are necessary to carry out a method according to the invention.

In principle, it is possible that the exhaust gas sensor also does not supply exact measured values, or that deviations in the mixture ratio from the setpoint value, which were ascertained on the basis of an exhaust gas composition ascertained with the aid of the exhaust gas sensor, are attributable to other "error sources" during the operation of the combustion unit. To prevent this from having a negative effect on the function check according to the invention, i.e. on the possible correction of the measured value of the HC sensor or the fuel mass flow derived therefrom or on the possible determination of the HC sensor as being defective, it may preferably be provided that a calibration of the measured value of the exhaust gas sensor is carried out during the operation of the internal combustion engine while the purging of the fuel tank system is deactivated, i.e. when no purge gas is conducted via the purge gas line. Therefore, if no purge gas is conducted via the purge gas line as a result of a deactivated purging of the fuel tank system, the measured value of the exhaust gas sensor may then be adjusted and possibly adapted in such a way that, in the case of the sufficiently precisely ascertainable fuel introduced into the combustion chamber or the combustion chambers via the fuel injector(s)—in connection with the sufficiently precisely ascertainable oxygen also supplied to the combustion chamber—the mixture ratio resulting therefrom corresponds to of a defined, associated exhaust gas composition. Due to such a calibration of the measured value of the exhaust gas sensor, it may then be assumed with sufficient certainty that, in the case of a purge gas conducted via the purge gas line, i.e. in the case of a purging of the fuel tank system, a deviation of the mixture ratio from the associated setpoint value ascertained on the basis of the measured value of the exhaust gas sensor results from a measurement error of the HC sensor and this a subsequent, erroneous adaptation of fuel introduced into the combustion chamber and/or into the fresh gas tract with the aid of the fuel injector.

Depending on how the mass flow of the purge gas is ascertained, this conclusion may additionally require a calibration of the measured value of a sensor used to ascertain the mass flow of the purge gas to be carried out during the operation of the internal combustion engine while the purging of the fuel tank system is deactivated. This may be the case, for example, if a pressure sensor integrated into the purge gas line is used to ascertain the mass flow. The measured value thereof may then be checked and possibly calibrated, for example by an adjustment with the ambient pressure, during the operation of the internal combustion engine while the purging is deactivated.

However, if the mass flow of the purge gas is ascertained during the active purging of the fuel tank system, for example in that at least two sensors are integrated into the fresh gas tract, with the aid of which the mass flow of the fresh gas in the fresh gas tract is ascertainable upstream, on the one hand, and downstream, on the other hand, from the opening of the purge gas line, the potential influence thereof on a deviation of the measured value of the exhaust gas sensor during the active purging may be ruled out by the fact that its measured values were taken into account in the calibration of the measured value of the exhaust gas sensor while the purging was deactivated.

The purge gas conducted via the purge gas line during a purging of the fuel tank system may be, in particular, a mixture of gaseous fuel or gaseous hydrocarbons as well as ambient air, as is the case when the fuel vapor filter is regenerated by back-flushing it using ambient air. If necessary, the purge gas may, however, also be made up (essentially) exclusively of gaseous fuel or of gaseous hydrocarbons, for example if fuel vapors present in the fuel tank are not "vented" into the surroundings but directly into the fresh gas tract.

In particular, an internal combustion engine according to the invention may be part of a motor vehicle. The combustion unit of the internal combustion engine may be provided, in particular, for the direct or indirect provision of the driving power for the motor vehicle. The invention therefore also relates to a motor vehicle, in particular a wheel-based and not a railbound motor vehicle (preferably a passenger car or truck), which includes an internal combustion engine according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows a schematic representation of an internal combustion engine according to the invention.

DETAILED DESCRIPTION

The FIGURE shows an internal combustion engine according to the invention for a motor vehicle, including a fuel tank system. The latter comprises a fuel tank 1, which is connected via a venting line 2 to a fuel vapor filter 3, which may be designed, in particular, in the form of an active carbon filter or may at least include one of this type. Fuel vapor filter 3 is furthermore connected to a fresh gas tract 5 of the internal combustion engine via a purge gas line 4, purge gas line 4 opening into fresh gas tract 5 upstream (with respect to the flow direction of fresh gas in fresh gas tract 5 in the direction of a combustion unit 6 of the internal combustion engine) of a fresh gas compressor 7 integrated into fresh gas tract 5. Fresh gas compressor 7 is part of an exhaust gas turbocharger, which further comprises an exhaust gas turbine 8, which is integrated into exhaust tract 9 of the internal combustion engine. In the charge air section of fresh gas tract 5 situated between fresh gas compressor 7 and combustion unit 6, a throttle valve 10 is also provided, which divides the charge air section into a segment situated upstream and frequently referred to as the pressure pipe, and into a segment situated downstream, which is frequently referred to as the intake manifold.

During the operation of the internal combustion engine, mixture quantities are combusted in the known manner in a defined sequence in combustion chambers 11 of combustion unit 6, which are partially limited by cylinders 12 of combustion unit 6. These mixture quantities are made up of fresh gas, which is completely or mainly made up of ambient air and has been sucked in from the surroundings via an air filter 13, as well as completely or mainly of fuel, which is injected into combustion cambers 11, for example directly with the aid of fuel injectors 14. The pressure increases in combustion chambers 11 generated by the combustion processes are used to move pistons 15 guided in cylinders 12. These movements of pistons 15 are converted into a rotational movement of a crankshaft (not illustrated), with connecting rods (not illustrated) connected therebetween, the guidance of pistons 15 via the connecting rods with the aid of the crankshaft simultaneously resulting in a cyclical back-and-forth movement of pistons 15. The exhaust gas resulting during the combustion of the fresh gas/fuel mixture quantities in combustion chambers 11 is discharged via exhaust tract 9 and flows through exhaust gas turbine 8, which results in a rotating driving of a turbine rotor (not illustrated). This rotation of the turbine rotor is transmitted to a compressor rotor (not illustrated) of fresh gas compressor 7 with the aid of a shaft 16, whereby fresh gas compressor 7 ensures a compression of the fresh gas to be conducted to combustion unit 6 via fresh gas tract 5.

Fuel vapor filter 3 of fuel tank system is gas-conductively connected to the surroundings by its side facing away from venting line 2 and purge gas line 4 (with respect to its filtering effect for fuel vapors) via an ambient air line 17, for which purpose ambient air line 17 forms a surroundings opening 18.

Fuel tank 1 is partially filled with fuel, one part of this fuel, which is actually liquid under normal environmental conductions, generally being evaporated, so that fuel in the liquid aggregate state is also present in fuel tank 1. Such an evaporation of fuel in fuel tank 1 is favored, in particular by relatively high ambient temperatures as well as by a reduction of the ambient pressure, for example as a result of an uphill travel of a motor vehicle comprising the internal combustion engine. To avoid an impermissibly high overpressure in fuel tank 1, due to an evaporation of this type, the possibility of a pressure compensation using the ambient pressure via venting line 2 and fuel vapor filter 3 as well as via ambient air line 17 is given, the fact that a pressure compensation of this type resulting in an escape of fuel vapors into the surroundings being prevented by fuel vapor filter 3.

Such a venting of fuel tank 1 results in an increasing saturation of fuel vapor filter 3, which, in turn, makes it necessary to regenerate it at regular intervals. A purging of fuel vapor filter 3 is provided for this purpose, in that ambient air is sucked in via surroundings opening 18 and ambient air line 17. This ambient air flows through fuel vapor filter 3 in the opposite direction, compared to the through-flow of fuel vapor filter 3 with the aid of the vaporized fuel during the venting of fuel tank 1, whereby fuel molecules absorbed in fuel vapor filter 3 are carried along by the ambient air and introduced into fresh gas tract 5 via purge gas line 4. This fuel is supplied thereby to a combustion in combustion chambers 11 of combustion unit 6.

A purging of fuel vapor filter 3 in this manner is only periodically provided and always during the operation of combustion unit 6, because only then may the fuel introduced into fresh gas tract 5 by the purging of fuel vapor filter 3 also be safely supplied to a combustion in combustion chambers 11. An introduction into fresh gas tract 5 during a non-operation of combustion unit 6 could, however, result in the fact that the gaseous fuel could escape into the surroundings via leaks in fresh gas tract 5 and, in particular, via an intake opening of fresh gas tract 5.

A tank venting valve 20 is integrated into purge gas line 4, which is disposed or integrated into fresh gas tract 5 preferably close to opening 19 of purge gas line 4.

A sufficient pressure gradient between the ambient pressure, on the one hand, and the pressure in fresh gas tract 5, on the other hand, in the area of opening 19 of purge gas line 4 is necessary for purging fuel vapor filter 3. This pressure gradient is not always present, due to heavily fluctuating pressures in fresh gas tract 5 during an operation of combustion unit 6. To permit a purging of fuel vapor filter 3 at any time, so that a complete saturation thereof may be safely prevented, the fuel tank system of the internal combustion engine also comprises a purge gas delivery device 21 integrated into purge gas line 4, which is usually also referred to as a "purge air pump" and which may be designed, for example, in the form of a reciprocating compressor, in particular as a vane-type compressor or as a centrifugal blower. Due to an operation of this purge gas delivery device 21, ambient air may be actively sucked in via surroundings opening 18, which then flows through fuel vapor filter 3 for the purging thereof, and which may be transported to opening 19 of purge gas line 4 via purge gas delivery device 21 and tank venting valve 20, which is then at least partially opened.

At least purge gas delivery device 21, tank venting valve 20, throttle valve 10 and fuel injectors 14 are controllable with the aid of a control device 22 (e.g. in the form of a central engine controller of the internal combustion engine). At the same time, control device 22 receives measuring signals of an HC sensor 23 integrated into purge gas line 4 in a segment between purge gas delivery device 21 and tank venting valve 20, an exhaust gas sensor 25 integrated into exhaust tract 9 downstream from exhaust gas turbine 8, a mass flow sensor 24 integrated into fresh gas tract 5 upstream from opening 19 of purge gas line 4, and a pressure sensor 26 integrated into fresh gas tract 5 downstream from opening 19.

Exhaust gas which arises in combustion chambers 11 of combustion unit 6 during the combustion of the fuel/fresh gas mixture quantities flows around exhaust gas sensor 25 integrated into exhaust tract 9, which subsequently generates a measuring signal, which represents, for example, the portion of residual oxygen in the exhaust gas. This measuring signal is transmitted to control device 22.

The mass flow of fuel, for example of hydrocarbons, which is introduced from purge gas line 4 into fresh gas tract 5, is ascertained during a purging of the fuel tank system. The mass flow of the purge gas flowing in purge gas line 4 is ascertained by comparing the mass flows of the fresh gas flowing through fresh gas tract 5 and with the aid of the mass flow sensor 24 disposed upstream from opening 19 of purge gas line 4, on the one hand, and with the aid of pressure sensor 26 disposed downstream from opening 19, on the other hand. In addition, the contact or concentration of the hydrocarbons in this purge gas is measured with the aid of HC sensor 23.

To compensate for this additional mass of fuel, which reaches combustion chambers 11 as part of the purge gas and thus also the fresh gas, the individual quantities of the fuel introduced into combustion chambers 11 with the aid of fuel injectors 14 is adapted accordingly to maintain a defined, in particular stoichiometric mixture ratio, taking into account the specific operating state of combustion unit 6 and the fresh gas masses supplied to combustion chambers 11. Whether this mixture ratio is, in fact, maintained is checked with the aid of exhaust gas sensor 25. If a deviation results in the ascertained mixture ratio derived from an exhaust gas composition ascertained with the aid of exhaust gas sensor 25 from an associated setpoint value, a corresponding correction of the measured value of HC sensor 23 or the fuel mass flow ascertained from this measured value is carried out in such a way that the ascertained mixture ratio corresponds to the setpoint value, provided that the deviation is less than a threshold value or corresponds to this threshold value. However, if this deviation is above the threshold value, HC sensor 23 is determined to be defective. This may result in a corresponding error message, which may be stored in the control device and possibly also be made visible by a display on the instrument panel of the motor vehicle.

If, however, no purging of fuel vapor filter 3 or the entire fuel tank system is carried out, no purge gas is conducted via purge gas line 4 and thus also not introduced into fresh gas tract 5. The fuel quantities needed for the provided operation of combustion unit 6 are then supplied to combustion chambers 11 exclusively with the aid of fuel injectors 14. These fuel quantities are ascertainable sufficiently precisely, for example, from the pressure of the fuel supplied to fuel injectors 14 as well as from the duration of the activation of fuel injectors 14 with the aid of control device 22 and thus the particular opening duration of fuel injectors 14. The fresh gas mass flow simultaneously supplied to combustion chambers 11 is also sufficiently precisely ascertainable with the aid of mass flow sensor 24 and/or pressure sensor 16, these two sensor also being expected to supply the same or comparable values. As a result, the mixture ratio of the fuel/fresh gas mixture quantities supplied to combustion chambers 11 may be relatively precisely set during an operation of the internal combustion engine while the purging of the fuel tank system is deactivated. If deviations of the exhaust gas composition ascertained with the aid of exhaust gas sensor 25 from a composition which should actually correspond to the set mixture ratio therefore occur during such an operation of the internal combustion engine while the purging of the fuel tank system is deactivated, a purging of the fuel tank system may be concluded as the cause of this deviation, because a purging of this type is not being carried out. This makes it possible to adapt or calibrate the measured value of exhaust gas sensor 25 accordingly by generating an adaptation value, so that this calibrated measured value corresponds to an exhaust gas composition which is suitable for the set mixture ratio. With the aid of such a calibration of the measured value of the exhaust gas sensor, it is possible to ensure that, during a subsequent purging of the fuel tank system, deviations of the mixture ratio of the fuel/fresh gas mixture quantities supplied to combustion chambers 11 from an associated setpoint value, which were ascertained using the exhaust gas composition measured with the aid of exhaust gas sensor 25, may be assigned to measurement errors of HC sensor 23. After all, errors in ascertaining the fuel quantities introduced via fuel injectors 14, in ascertaining the mass flows of the fresh gas conducted via the fresh gas tract as well as in ascertaining the mass flow of the purge gas conducted via purge gas line 4 and introduced into the fresh gas tract were adapted for the calibration during the operation of the internal combustion engine while the purging of the fuel tank system was deactivated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine, which comprises
    providing a combustion unit, including at least one combustion chamber, a fresh gas tract, an exhaust tract including an exhaust gas sensor integrated therein and a fuel tank system comprising a fuel tank, a fuel vapor filter, which is fluid-conductively connected to a surroundings opening, a venting line leading from the fuel tank to the fuel vapor filter, and a purge gas line leading from the fuel vapor filter to the fresh gas tract into which an HC sensor and a tank venting valve and/or a purge gas delivery device are integrated;
    ascertaining, during an operation of the internal combustion engine while purge gas is conducted via the purge gas line, a hydrocarbon content of the purge gas via the HC sensor; and
    ascertaining a mass flow of the purge gas and a fuel mass flow introduced into the fresh gas tract;
    adapting a quantity of fuel introduced into the combustion chamber and/or into the fresh gas tract via at least one fuel injector; and
    monitoring, based on an exhaust gas composition ascertained with the aid of the exhaust gas sensor, a mixture ratio of fuel/fresh gas mixture quantities supplied to the combustion chamber with respect to a deviation from a setpoint value, and, upon ascertaining a deviation of this type, a correction of the measured value of the HC sensor or the fuel mass flow ascertained therefrom is carried out, or the HC sensor is determined to be defective.

2. The method according to claim 1, wherein a correction of the measuring signal of the HC sensor or the fuel mass flow ascertained therefrom is carried out if the deviation is below a threshold value or corresponds to this threshold value, and the HC sensor is determined to be defective if the deviation is above a or the threshold value.

3. The method according to claim 1, wherein a calibration of the measured value of the exhaust gas sensor is carried out during the operation of the internal combustion engine while the purging of the fuel tank system is deactivated.

4. The method according to claim 1, wherein a calibration of the measured value of a sensor, which is used to ascertain the mass flow of the purge gas, is carried out during the operation of the internal combustion engine while the purging of the fuel tank system is deactivated.

5. The method according to claim 1, wherein the mass flow of the purge gas is measured or modeled.

6. An internal combustion engine comprising:
    a combustion unit including at least one combustion chamber;
    a fresh gas tract;
    an exhaust tract including an exhaust gas sensor integrated therein;
    a fuel tank system comprising:
        a fuel tank;
        a fuel vapor filter, which is fluid-conductively connected to a surroundings opening;
        a venting line leading from the fuel tank to the fuel vapor filter; and
        a purge gas line leading from the fuel vapor filter to the fresh gas tract into which an HC sensor and a tank venting valve (20) and/or a purge gas delivery device are integrated; and
    a control device configured to carry out the method according to claim 1.

7. The internal combustion engine according to claim 6, further comprising a sensor to ascertain a mass flow of the purge gas.

8. A motor vehicle comprising an internal combustion engine according to claim 6.

* * * * *